United States Patent [19]
Schmitt

[11] Patent Number: 4,596,394
[45] Date of Patent: Jun. 24, 1986

[54] CARTRIDGE SEAL

[75] Inventor: Wilhelm Schmitt, Heppenheim-Erbach, Fed. Rep. of Germany

[73] Assignee: Firma Carl Freudenberg, Weinheim, Fed. Rep. of Germany

[21] Appl. No.: 715,088

[22] Filed: Mar. 22, 1985

[30] Foreign Application Priority Data

Apr. 13, 1984 [DE] Fed. Rep. of Germany ....... 3414008

[51] Int. Cl.$^4$ .......................... F16J 15/32; F16J 15/34
[52] U.S. Cl. ......................................... 277/38; 277/39; 277/152
[58] Field of Search ..................... 277/38, 39, 152, 153

[56] References Cited

U.S. PATENT DOCUMENTS

| | | | |
|---|---|---|---|
| 3,330,564 | 7/1967 | Sikora | 277/39 |
| 4,049,281 | 9/1977 | Bainard | 277/38 |
| 4,185,838 | 1/1980 | Danner | 277/152 |
| 4,311,346 | 1/1982 | Danner | 277/39 |
| 4,437,673 | 3/1984 | Miyamoto | 277/38 |
| 4,516,783 | 5/1985 | Mitsue | 277/152 |
| 4,544,168 | 10/1985 | Hans et al. | 277/152 |

Primary Examiner—Robert I. Smith
Attorney, Agent, or Firm—Felfe & Lynch

[57] ABSTRACT

A cartridge seal has concentric outer and inner rings which snap together relatively rotatably to form the cartridge. Each ring has a generally L-shaped, inner axial profile with generally axial and radial legs thereof oppositely disposed. A sealing lip on the radial leg of the outer ring sealingly bears against an abutment surface on the radial leg of the inner ring to accommodate radial excursions during relative rotation therebetween. At least the radial leg of the inner ring is made of a material, for example metal, which conducts heat well. Frictional heat of the sealing lip against the abutment upon relative rotation is thus conducted to the surface of the radial leg of the inner ring opposite the abutment surface for dissipation. Heat dissipation is further improved with depressions in the opposite surface for expanding its surface area and, if the depressions are radial grooves, circulating a fluid medium wetting the surface to carry away the dissipated heat.

20 Claims, 2 Drawing Figures

CARTRIDGE SEAL

BACKGROUND OF THE INVENTION

The invention relates to a cartridge or unit seal for sealing about a shaft rotatable relative thereto.

A known cartridge seal has an outer ring and an inner ring. The outer ring has an elastically-resilient sealing lip which bears, elastically prestressed, on the inner ring and a radial supporting surface which extends toward the sealing lip and is resiliently snapped into holding surface of the inner ring with space therebetween for relative rotation of the rings. At least one of the supporting and holding surfaces extends all the way around its ring to hold the relatively-rotatable rings together as a cartridge.

A cartridge seal of this type is disclosed in German Pat. No. 25 00 099. It has the sealing lip of the outer ring bearing on an axially-extending abutment surface on one side of the inner ring and a rubber-elastic intermediate layer on the other side of the inner ring securing the inner ring sealingly in position about the surface of a shaft. The sealing efficiency so obtained is less than satisfactory, however, particularly when high shaft speeds and/or radial shaft excursions occur in normal operation.

SUMMARY OF THE INVENTION

Accordingly, an object of the invention is to improve a cartridge seal in such a way that high shaft speeds and/or radial shaft excursions will not diminish the sealing efficiency.

This and other objects are achieved in accordance with the invention with a cartridge seal having outer and inner, concentric rings. Each ring has a generally L-shaped, inner axial profile with oppositely-disposed, generally axial and radial legs. The radial leg of the inner ring and the axial leg of the outer ring have cooperative holding and supporting surfaces, for example a flange about the end of the radial leg of the inner ring and a groove about the axial leg of the outer ring, for relatively-rotatably holding the rings together as a cartridge. The outside of the axial leg of the outer ring can then be fixedly sealed in an opening in a structure and the inside of the inner ring sealed about a shaft relatively rotatable in the opening of the structure for rotation with the shaft.

The radial leg of the outer ring fixedly and sealingly carries a sealing lip which bears elastically prestressed and, thus, sealingly against an abutment surface on the generally radial leg of the inner ring. Because the abutment surface for the sealing lip is generally radial, radial shaft excursions have little affect on the reciprocal contact pressure therebetween and, thus, the sealing efficiency between the sealing lip and abutment surface. Also, the centrifugal forces in use are conducive to sealing efficiency.

At least the radial leg of the inner ring and, preferably, the entire inner ring is made from a material which conducts heat well, for example, metal. The outside of the radial leg of the inner ring, opposite the abutment surface is to be in contact with (wet by) a fluid to be sealed with the cartridge seal. Heat in the seal, for example from the friction of the sealing lip against the abutment surface, is, therefore, conducted well through the radial leg of the inner ring to the sealed fluid for dissipation. High shaft rotational speeds and, therefore, high friction heating at the sealing lip therefore have little affect on the seal.

The axial thickness of the inner ring between the abutment surface and the wet surface is very small, generally only from about 0.5 to about 5 mm, so that the frictional heat from the dynamic sealing zone between the sealing lip and abutment surface is readily conducted away and transmitted to the sealed medium. It is therefore unlikely that the sealing lip will become sticky or embrittled in operation, even if it is made of a rubber-elastic material. The sealing lip may, therefore, be made of any of the polymeric materials commonly used for the purpose including, for example, polytetrafluoroethylene, nitrile-butadiene rubber, acrylate caoutchouc, fluor caoutchouc, and silicone caoutchouc.

In an advantageous embodiment, the sealing lip and/or the abutment surface is or are provided with hydrodynamically-acting return elements. The desired sealing action will be appreciably improved thereby.

Another factor which affects the sealing efficiency obtained is the contact pressure of the sealing lip on the abutment surface. To obtain good results in this respect, it has been found advantageous for the abutment surface and the axis of the seal rings to make an angle toward the outside, wet, radial-leg surface of the inner ring opposite the abutment surface, i.e. in the direction of the sealed space, that is slightly under 90°. The preferred range is from about 60° to about 90°.

Where, in addition to radial excursions of the sealed shaft, some axial displacement must also be tolerated, it has proved advantageous for the sealing lip to be a substantially-radial, outer, peripheral surface zone of a diaphragm-like intermediate ring. This provides greater assurance that the sealing lip will exert the necessary, sealing contact pressure on the abutment surface in spite of axial shaft excursions.

When the sealing lip is made of a polymeric material, its prestressed, sealing contact pressure against the abutment surface may diminish in the course of time due to loss of elasticity. To prevent this, it has proved advantageous to provide the intermediate ring with an outwardly-open groove in which an elastically-expanded, garter-like spring element, preferably made of a metallic material, is disposed. This provides greater assurance of sufficient, sealing contact pressure of the sealing lip on the abutment surface over an extended period of time even with high temperatures.

To reduce wear on the abutment surface, the inner ring is advantageously made of hardened steel. The Rockwell hardness may be about 60. Installation is facilitated when the inner ring is mounted on the sealed shaft, liquid-tight, and secured against angular displacement relative thereto, with an elastically-resilient intermediate ring or layer, as in the cartridge seal according to the German Pat. No. 25 00 099 cited above.

The outside, wet, radial surface of the inner ring also may be provided with depressions which are outwardly open and extend generally in the radial direction. The surface area available for the transfer of heat to the sealed medium is thus enlarge, and the depressions may also circulate the sealed fluid along the wet surface, both with the result that the temperatures prevailing in the area of the dynamic sealing zone will approximately-correspond to those of the sealed medium. Critical temperatures are thus even more reliably avoided.

The radial leg of the outer ring may also be provided with a dust lip which bears on the axial leg of the inside profile of the inner ring. The sealing and dust lips can be made as a single-piece sealing member to facilitate production. The dust lip protects the sealing lip from the action of abrasive materials from the environment on its side of the seal.

The inner ring and/or the dust lip may also be provided in the area of their contact with hydrodynamically-acting return elements for dust. Foreign matter is thus discouraged from lodging in the interior of the cartridge seal.

When return elements are provided for both the dust and sealing lips, it is possible to give the return elements for each the same dimensions. This will greatly facilitate production, especially of the one-piece sealing member for both lips. Because of the radial orientation of the sealing lip and, thus, the higher relative speed of the return elements associated therewith, the return elements associated with the sealing lip are always more effective than the return elements associated with the dust lip. Thus, there is no likelihood of leaks even with such an embodiment.

The outer ring may be advantageously made of a plastic such as polypropylene or polyester. These possess some resilience which will greatly aid in achieving the static sealing necessary with respect to the opening in the structure accommodating the seal. Moreover, shaping is relatively simple when injection-, compression- or transfer-molding techniques are used and these also eliminate the need for finishing operations. It is also possible with conventional, single-tool techniques to combine the manufacture of outer ring and sealing lip or sealing member. The operation of joining these two parts which would be necessary if they were manufactured separately thus is eliminated.

The snapped-together, captive connection of the inner and outer rings prevents damage to the sealing lip in storage and transportation despite the slight relative play between them necessary for their relative rotation. During installation, however, there is no need for special adjustment of the inner ring relative to the outer ring before the cartridge seal is placed in service.

BRIEF DESCRIPTION OF THE DRAWINGS

Two merely-exemplary embodiments of the invention are described below in greater detail and illustrated in the accompanying drawings, wherein.

DETAILED DESCRIPTION OF THE INVENTION

Figure 1:
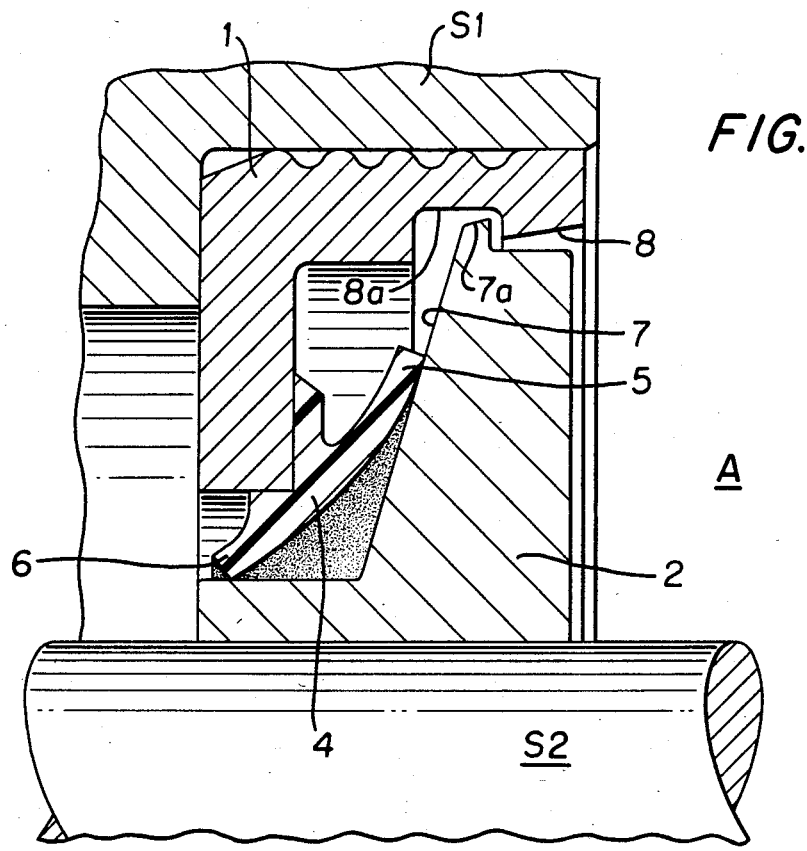
FIG. 1 is an axial, sectional elevation of half of one preferred embodiment with a shaft and structure, as in use.

The cartridge seal shown in FIG. 1 has an outer ring 1 sealingly set in an opening in a structure S1 and a concentric inner ring 2 sealingly set about a shaft S2 which is rotatable relative to the structure for relative rotation with the shaft. (Neither the structure nor the shaft are part of the invention.) Both rings have a generally, L-shaped, inner axial profile which are dimensionally coordinated and oppositely positioned relative to each other in such a way as to enclose a generally-rectangular hollow space.

The outer ring 1 is made of epoxy resin. The leg of its L-shaped profile which projects inwardly in the radial direction has a sealing member 4 made of an acrylonitrile/butadiene copolymer directly vulcanized to it. The sealing member 4 has a sealing lip 5 and a dust lip 6 toward opposite ends. Both lips bear elastically prestressed on respective abutment surfaces on the insides of the legs of the L-shaped profile of the inner ring only by reason of their elastity from the configuration and material of the sealing member and the dimensions of the lips.

The abutment surface 7 associated with the sealing lip 5 is on the radial leg of the inner ring and makes an angle of about 73° rightward to the axis of the seal. They define a sealed space A on one side of the seal. The abutment surface associated with the dust lip 6 is generally coaxial with the seal. The elastic prestressing of the dust lip thereagainst is not appreciable because it is primarily intended only to prevent the infiltration of dust into the interior hollow space of the cartridge seal.

The inner ring 2 is made of hardened steel. It has a flange-like projection 7a about the outer periphery of its radial leg. The projection 7a projects with all-around clearance into an inwardly-open groove 8a on the axial leg of the outer ring to unite the rings captively into the cartridge seal. The outside of the projection 7a and the inside portion 8 of the outer ring leading to the groove 8a are conically tapered axially into the rings. Assembly of the two rings into the cartridge seal thus is facilitated.

Assembly requires that the projection 7a snap into the inwardly-open groove 8a in the outer ring 1 because the maximum diameter of the projection is made a few tenths of a millimeter larger than the minimum inside diameter of the inside portion 8 of the opening in the outer ring 1. The elastic deformation of the outer ring necessary for such snap-in engagement can be brought about only with the cartridge seal in the uninstalled condition. However, it is sufficiently slight that there is no danger of mechanical damage to the outer ring 1 as a result of the deformation.

The abutment surfaces of the inner ring for the sealing and dust lip 5, 6 both have a surface quality obtainable by a grinding operation, for example. It is characterized by fine grooves extending appropriately, for example toward the periphery of surface 7, so as to develop a conveying action in the direction of the sealed space A when the shaft is rotating on fluid which seeps therebetween. The sealing lip 5 has a larger diameter than the dust lip 6. The conveying effect of the sealing lip 5 and its abutment surface therefore is more pronounced than that of the dust lip 6 and its abutment surface. This advantageously enhances the sealing efficiency obtained.

Figure 2:
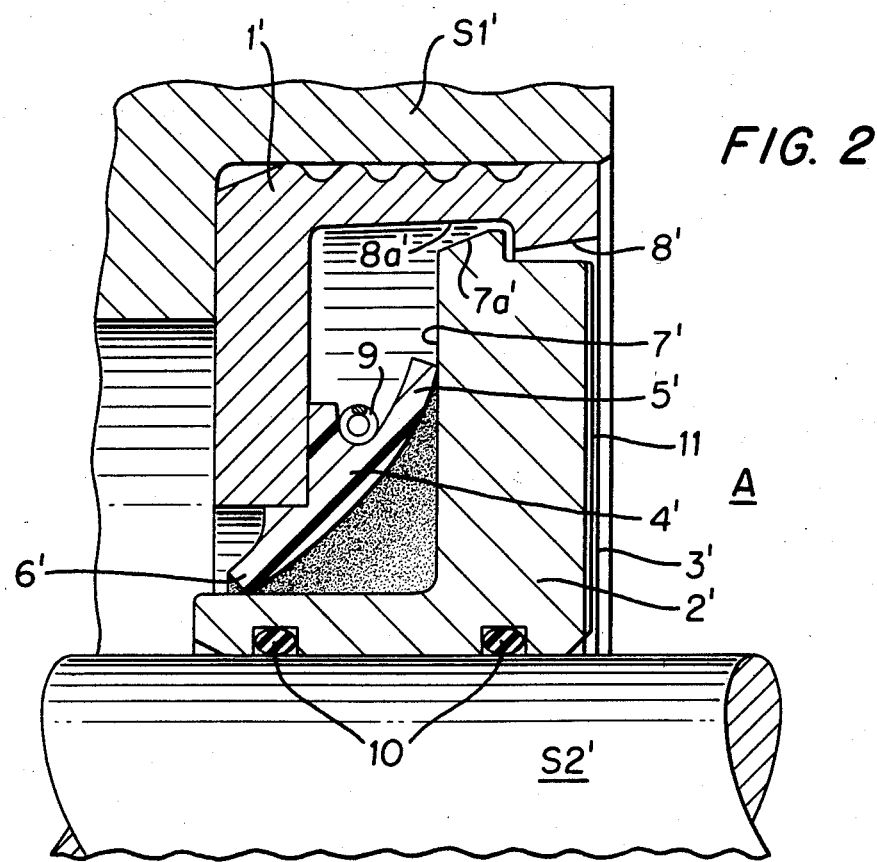
FIG. 2 is an axial, sectional elevation of half of second preferred embodiment with a shaft and structure, as in use.

The embodiment of a cartridge seal shown in FIG. 2 is outwardly quite similar to that described above. For the axial contact pressure between the sealing lip 5' and its abutment surface 7', however, an additional garter spring element 9 is provided in this case. The garter spring is in snap-in engagement with an outwardly-open groove about the sealing member 4' near the sealing lip.

The abutment surface 7' of the inner ring 2' which is associated with the sealing lip 5' makes an angle of 90° with the axis of rotation in this case, but the abutment surface associated with the dust lip 6' extends coaxially, as before.

The inner ring is mounted on the surface of the shaft liquid-tight and secured against angular displacement relative thereto by elastomeric O-rings 10. As with the embodiment described in connection with FIG. 1, therefore, it rotates with the shaft.

The inner ring 2' is provided on its wet side 3' with radial depressions 11. A pronounced, outwardlydirected conveying action is therefore exerted on the medium sealed in at A, and also because of the enlarged surface, this improves dissipation of heat from the metalic inner ring 2. The occurrence of critical temperatures, especially at the sealing lip 5, thus is reliably prevented.

It will be appreciated that the instant specification and claims are set forth by way of illustration and not of limitation, and that various changes and modifications may be made without departing from the spirit and scope of the present invention.

What is claimed is:

1. A cartridge seal, comprising:
   concentric outer and inner rings each having a generally L-shaped, inner axial profile with oppositely-disposed, generally axial and radial legs;
   cooperative holding and support surfaces on the radial leg of the inner ring and axial leg of the outer ring for relatively-rotatably holding the rings together as a cartridge;
   a sealing lip fixedly and sealingly carried on the radial leg of the outer ring for bearing, elastically prestressed, against a portion of the generally radial leg of the inner axial profile of the inner ring thereby defined as an abutment surface, whereby to form a relatively rotatable seal between the sealing lip and abutment surface accommodating radial excursions; and
   means comprising forming at least the radial leg of the inner ring from a material which conducts heat well for conducting heat from the abutment surface to the opposite surface of the radial leg of the inner ring, whereby to dissipate the frictional heat from the sealing lip and abutment surface upon relative rotation therebetween into a medium wetting the opposite surface.

2. The cartridge seal of claim 1, and further comprising hydrodynamically-acting return elements on at least one of the sealing lip and abutment surface.

3. The cartridge seal of claim 1, wherein the abutment surface makes an angle of from about 60° to about 90° to the axis of the rings toward the surface of the radial leg of the inner ring opposite the abutment surface.

4. The cartridge seal of claim 2, wherein the abutment surface makes an angle of from about 60° to about 90° to the axis of the rings toward the surface of the radial leg of the inner ring opposite the abutment surface.

5. The cartridge seal of claim 1, wherein the sealing lip comprises the outer periphery of a diaphragm-like intermediate ring fixed to the outer ring.

6. The cartridge seal of claim 4, wherein the sealing lip comprises the outer periphery of a diaphragm-like intermediate ring fixed to the outer ring.

7. The cartridge seal of claim 5, and further comprising a garter-like spring element about the intermediate ring for urging the sealing lip against the abutment surface.

8. The cartridge seal of claim 6, and further comprising a garter-like spring element about the intermediate ring for urging the sealing lip against the abutment surface.

9. The cartridge seal of claim 5, wherein the intermediate ring extends away from the sealing lip to a dust lip which is elastically prestressed against the axial leg of inner ring, whereby to form a sealing member.

10. The cartridge seal of claim 2, wherein the intermediate ring extends away from the sealing lip to a dust lip which is elastically prestressed against the axial leg of inner ring, whereby to form a sealing member.

11. The cartridge seal of claim 8, wherein the intermediate ring extends away from the sealing lip to a dust lip which is elastically prestressed against the axial leg of inner ring, whereby to form a sealing member.

12. The cartridge seal of claim 10, and further comprising hydrodynamically-acting return elements on at least one of the dust lip and axial leg of the inner ring having the same dimensions as those on the at least one of the sealing lip and abutment surface.

13. The cartridge seal of claim 11, and further comprising hydrodynamically-acting return elements on at least one of the dust lip and axial leg of the inner ring having the same dimensions as those on the at least one of the sealing lip and abutment surface.

14. The cartridge seal of claim 1, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

15. The cartridge seal of claim 2, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

16. The cartridge seal of claim 3, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

17. The cartridge seal of claim 5, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

18. The cartridge seal of claim 7, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

19. The cartridge seal of claim 9, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

20. The cartridge seal of claim 13, and further comprising outwardly-open, radial depressions in the surface of the radial leg of the inner ring opposite the abutment surface for expanding its surface area and, upon rotation of the inner ring, circulating a fluid medium wetting the same, whereby to improve the heat dissipation of the radial leg of the inner ring.

* * * * *